Patented June 10, 1930

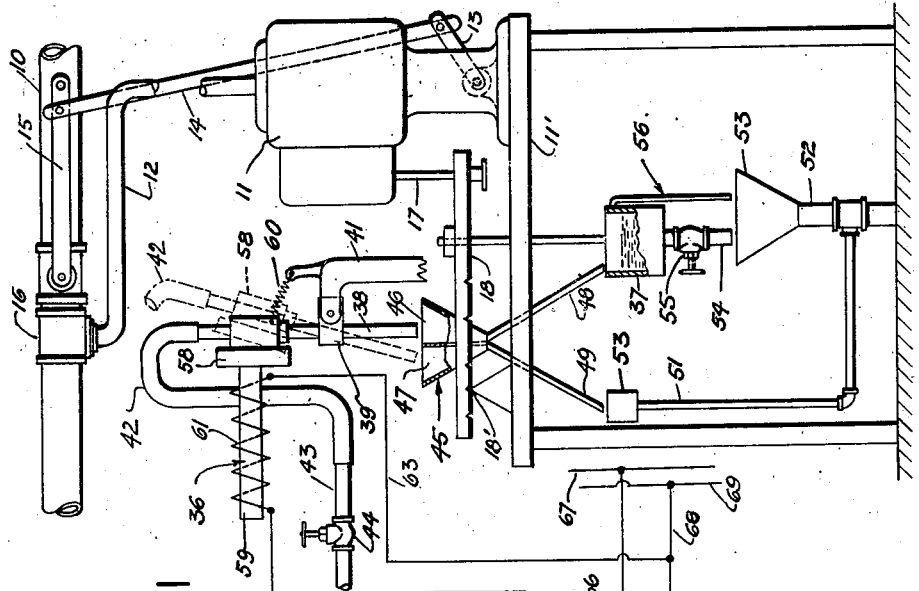

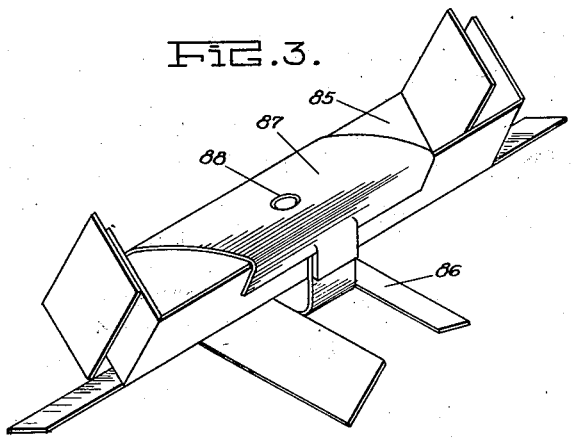
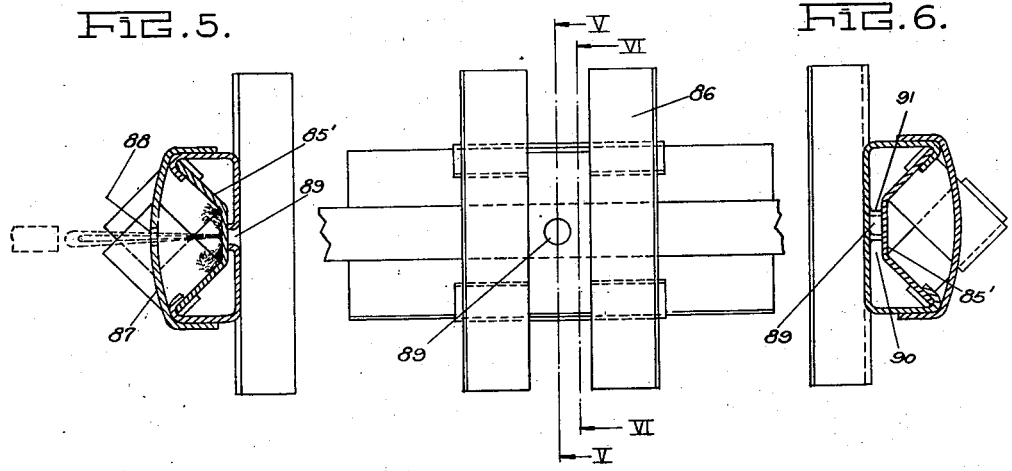
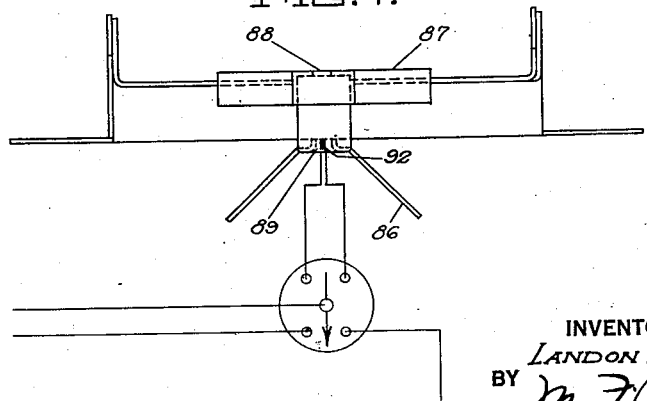

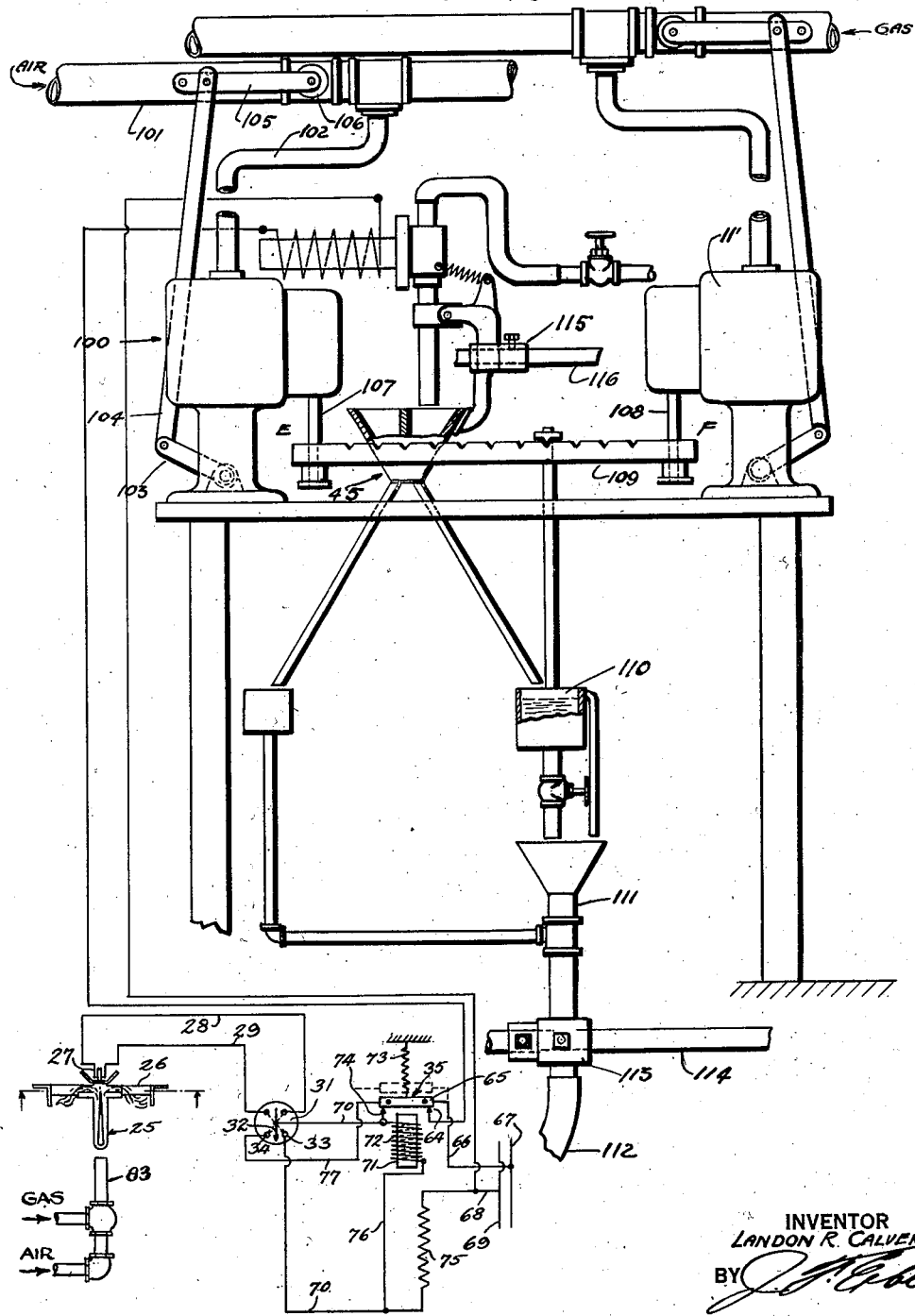

1,762,156

UNITED STATES PATENT OFFICE

LANDON R. CALVERT, OF NEWARK, NEW JERSEY, ASSIGNOR TO WESTINGHOUSE LAMP COMPANY, A CORPORATION OF PENNSYLVANIA

APPARATUS FOR CONTROLLING A FLUID FLOW

Application filed July 30, 1926. Serial No. 125,903.

This invention relates to apparatus for maintaining a gas flame at a standard length and temperature and more particularly to the control of a multiplicity of gas flames employed in connection with glass-working machines.

In the manufacture of certain composite glass articles, it is necessary to provide means for rendering the component parts of the article plastic in order that they may be joined by a glass-working operation. In accomplishing the proper union of a plurality of glass parts, it has been found desirable to employ a gas flame which may be directed to soften the parts and put them in condition for consolidation by fusion.

For the purpose of attaining uniformity in the fusing operation, it is necessary that the flame or flames be maintained at a constant length and that the temperature be kept uniform. It has been found that where a relatively great number of machines are distributed over a large area and gas conducted in the usual manner to each machine by a system of piping that the ignited gases issuing from the numerous nozzles vary in flame length and temperature by reason of changes in pressure in the main gas line, as well as by variations in the density and chemical composition of the fluid.

For the purpose of regulating the pressure, it is common to provide the system with some well-known type of pressure regulator which may be termed a primary or pressure regulator disposed between the feeder of the system and the gas main. One well-known type of device which has been found to be advantageous is known as the Smoot regulator. Although the pressure regulating device may be relatively sensitive and of quick action and amply sufficient for regulating and maintaining gas at a given pressure, the variations in the gas density and its chemical composition cause a variation in the temperature of the heating flames and in the flame length which variations are not controllable by the said pressure regulator.

An object of the present invention is, therefore, to provide a supersensitive or supplemental control device which automatically operates to maintain the temperature and flame length of a heating fire uniform irrespective of the chemical composition gas density or other disturbing properties of the fuel.

Another object of the invention is to provide an apparatus for regulating a flow of fluid by controlling the temperature and flame length of an ignited portion of the fluid.

Another object is to maintain a constant gas flame by controlling the pressure and flow of the gas and air and by varying the relation of the one to the other.

In carrying out the present invention, I utilize a standard or master flame which is directed to operate an electric thermocouple. The thermocouple is so arranged that upon an increase in the temperature or flame length of the master flame a suitable relay is actuated which in turn operates a second relay to cause a regulation of the pressure regulator to adjust the same in accordance with the increase or decrease in temperature of the master flame. By controlling the pressure regulator, the amount of gas fed to the various flames in the system is varied and their length and temperature is maintained in accordance with the master flame positioned to affect the thermocouple. The various mechanisms for causing the automatic control comprise certain novel features of construction and of operation and the same will be more fully understood by reference to the accompanying drawing in which Fig. 1 is a diagrammatic representation of an embodiment of the present invention;

Fig. 2 is an enlarged view of a flame taken on a line at the point of impingement upon a baffle plate;

Fig. 3 is a perspective view of a novel form of baffle employed in connection with an electric thermocouple;

Fig. 4 is a rear view in elevation of the baffle shown in Fig. 2;

Fig. 5 is a view taken on line V—V in Fig. 4;

Fig. 6 is a view taken on line VI—VI in Fig. 4;

Fig. 7 is an edge view of the baffle showing its relation to an electric thermocouple and Fig. 8 is a modification of the apparatus showing means for controlling the pressure in the air line as well as the gas line.

The present invention may be applied to an auxiliary or supplemental control for a plurality of gas flames distributed throughout a factory and receiving fuel from a common source. As shown in the drawings, a main 10 may receive gas from any suitable source, not shown. Ordinarily, the factory gas is supplied from a local gas producer or more frequently from the city gas supply line. Before the gas is passed to the machines where it is to be used in the form of flames, it is common practice to regulate the gas pressure and as shown, a pressure regulator 11 is provided mounted on a supporting frame or table 11'. This regulator may be of any well-known type and is usually connected to the gas main by a conductor such as 12. Within the regulator is a suitably positioned diaphragm sensitive to the pressure within the main. The diaphragm operates to move a lever arm 13 which is connected to a link 14 pivoted to an arm 15 of a valve 16, which valve controls the inlet flow of gas. The diaphragm within the regulator may be set so that the valve 16 will be automatically opened and closed to maintain a given pressure of gas in that part of the main 10 which conducts fuel to the various machines or locations where it is to be used in the form of flames.

The pressure regulator 11 is usually supplied with a depending member 17 which under ordinary conditions is weighted and so associated with the diaphragm as to set the same to operate the valve 16 at a given pressure. In the present invention, the usual weights are omitted and the diaphragm is controlled by means of a lever member 18 in a manner to be hereinafter more fully described.

The structure comprising the pressure regulator, control valve, etc. just described is well-known and commonly employed in connection with gas burning systems.

As hereinbefore pointed out, however, the present invention aims to more accurately regulate the working length and temperature of the gas flames in a factory receiving fuel from the main 10. The commonly used elements of the system have been described first for a better understanding of the detailed description of the present novel construction which will now be more clearly set forth.

Gas entering the main 10 may be distributed throughout a factory to various machines such as glass-working machines, each machine employing a plurality of nozzles, such, for example, as 21, the flame 22 of which may be directed to heat glass parts 23 and 24 to render the same plastic and work or unite them. When uniting delicate glass parts, as for example, in the construction of a composite glass body such as an electrical incandescent lamp, it is important that the flame be maintained at a uniform length and that the heat of the flame be maintained at a constant temperature. A fine flame of uniform length and temperature is also of great advantage in other industries as for example in singeing or in the production of artificial silk.

Ordinarily with a gas of a suitable density and composition, the pressure regulator should maintain the proper working conditions of the flame. Owing to the fact that the composition of the gas varies, means are employed to compensate for such variation, which means may comprise a master flame 25 which is directed against a baffle 26 to heat the same. This baffle is constructed in an effective and novel manner and will be hereinafter more fully described.

At the opposite side of the baffle, I provide a thermocouple 27 of any suitable type in such position as to be responsive to the varying temperatures of the master flame 25. The thermocouple is connected by leads 28 and 29 to a meter 31 so that a fluctuation in the temperature of the thermocouple will cause an oscillation of a pointer 32 of the meter between contacts 33 and 34.

It will be understood that the drawing is merely diagrammatic and that contact may be made by means of suitable apparatus of multiplied energy controlled by the thermocouple, such apparatus is available and well-known in the art. The thermocouple by reason of the movement of the pointer 32 serves to operate a relay 35 which in turn operates a second relay 36, the latter causing a regulation of the pressure regulator 11.

The mechanism operated by the relay 36 for controlling the pressure regulator comprises a bucket 37 suspended from the lever arm 18 which is fulcrumed at 18'. By filling or emptying the bucket 37, a varying weight may be placed upon the arm 18 and consequently the depending member 17, resulting in an action corresponding to the manual removal and replacement of iron weights.

Fuid, such as water, is supplied to the bucket through a nozzle 38 held in a clamp 39 suitably pivoted to a stationary bracket 41. The nozzle is connected by a flexible pipe section 42 to a water supply line 43 having a valve 44 to vary the amount of water which may be permitted to pass through the nozzle 38.

Means for guiding the water into the bucket may comprise a duplex funnel 45 having compartments 46 and 47, the compartment 46 is provided with an outlet 48 positioned to discharge water into the bucket 37 and the compartment 47 is provided with an outlet 49 to direct water to pipe 51 for passage to a waste pipe 52, said pipe having a funnel-shaped opening 53 to receive waste water from the bucket 37, said bucket being provided with an outlet nozzle 54 controlled by a valve 55. An over-flow pipe 56 is also provided to direct any over-flow water from the bucket to waste pipe 52.

When the nozzle 38 is moved to position over compartment 46, the water flows into the bucket 37 and weight is supplied to the lever arm 18 and the pressure regulator operates to open the valve 16. An opposite movement of the nozzle 38 terminates the flow of water to the bucket, permitting the water to flow to waste and the bucket operates to hold the valve 16 open until the water has dripped from the bucket through an outlet 54. This mechanism is controlled through the relay 36 comprising an armature 58 mounted on the pivoted nozzle 38 and disposed in near relation to an iron core 59 surrounded by a coil 61. The coil 61 may be energized through conductors 62 and 63, the conductor 62 having a contact 64 which engages with an armature 65 of the relay 35, said armature having a lead 66 connected to one side 67 of an electrical supply line for the supply of electrical energy from a suitable source, not shown.

The conductor 63 may be connected through a conductor 68 to the other side 69 of said supply line. As, will be noted, the coil 61 may be in contact with the contact 64. When this contact is broken by a movement of the armature 65, the armature 58 of the relay 36 may by reason of spring 60 take the position shown in dotted lines thus positioning the nozzle 38 over the compartment 47 for a flow of water to waste.

The actuation of the relay 36 is controlled by relay 35 acting under the effect of the pointer 32 of the meter 31 associated with the thermocouple. The relay 35 may comprise an iron core 71 surrounded by a coil 72 having one end connected to pointer 32 by a conductor 70 and armature 65 which is normally urged away from the iron core by the spring 73. When the pointer 32 is positioned between the contacts 33 and 34, and the armature 65 engages with contact 64, and a contact 74, the coil 72 is energized through current flowing though conductor 68, resistance 75, conductor 76, through the coil, thence through contact 74, through the armature 65 and thru conductor 66.

When the pointer moves to contact 33 by reason of a variation in temperature of the thermocouple 27, the flow of current through the coil 72 is short-circuited through conductor 70', the pointer 32 and conductor 70. The armature 65 then moves away from the contacts 64 and 74. When the pointer moves away from the contact 33, the armature 65 cannot return because owing to the dis-engagement of the contact 74 and the armature 65, the coil 72 is unenergized. When the pointer 32 engages with the contact 34, however, current flows through the coil 72 through conductors 77 armature 65 and conductors 66, 76 and 68, since the movement of the pointer through the contact 34 connects conductor 77 with the armature 65, which is connected to the source of electrical energy by conductor 66.

It will be evident, therefore, that the needle 32 may, under the influence of the electro-magnet, move from one contact to the other and cause an actuation of the relays 35 and 36, the latter operating the mechanism which regulates the pressure regulator 11.

In addition to the master flame 25 it is desirable to have a second or standard of comparison flame 79 disposed adjacent to a scale 80 so that the inner cone 81 of the flame may, from time to time, be compared to ascertain whether or not it is of the proper standard size. The pipe line 19 which supplies gas to the standard and master flames, may be provided with a filter 82 and an air pipe line for supplying air for mixture with the gas for said flames, may also be provided with a filter 84. The use of these filters is optional and they are necessary only in connection with the controlling flames just mentioned in order to insure a more perfect combustion fluid.

As above set forth, the regulation of a number of gas flames is attained by employing a master flame in association with a thermocouple. For the purpose of transferring heat from the flame to the heater element of the thermocouple, the flame is intersected by the baffle 26, preferably of sheet metal such as nichrome. The baffle may be in the form of a plate which intersects the flame and the thermocouple may be disposed in contact with the opposite side of the plate, preferably at a point coincident with the longitudinal axis of the flame.

A gas flame (as shown in Fig. 2) is composed of an outer cone 79' and as mentioned above an inner cone 81, the inner cone is the shorter and the baffle 26 is positioned to intersect the inner cone 81 of the flame which is of a lower temperature than the surrounding portion or outer cone 79' of the flame 79, thus creating what may be termed a cool spot on the plate. The cool spot indicated by the numeral 81 is surrounded by a ring 81' of higher temperature; said ring being the cross sectional area of the outer cone, but as the cool spot varies in area, the heat of the ring will have a varying effect on the thermocouple which will react accordingly. It will be also seen that any variation in the temperature of the flame will cause a change in the temperature of the cold spot with a consequent effect upon the thermocouple.

Since the thermocouple is governed by variations in the diameter and temperature of the cool spot, if the flame begins to shorten due to a change in the composition of a gas, the inner cone, which creates the cool spot, will be drawn away from the plate and will be reduced in area causing the temperature of the thermocouple to rise by reason of the contraction or approach of the hot ring 81' thus actuating the needle 32 of the meter 31 of the thermocouple and causing the various mechanisms to operate to sufficiently increase the pressure in the gas main to bring the master flame 25 at the baffle back to its original form.

If the flame lengthens instead of growing shorter, the cool spot would obviously have increased in area and the heated ring would have receded and the needle 32 would have moved and the mechanism operated to reduce the gas pressure to bring the master flame to its original form.

As will be readily understood, the thermocouple or pyrometer must be governed by the variations of the cool spot and it has been found that although a flat plate may be used it has been found that when using a flat surfaced plate, a reverse action often occurs in that when the flame is increased in length due to variation in the gas composition, the heat is conducted to the thermocouple from the enlarged hot ring 81' to the end that instead of the thermocouple reaching a lower temperature a reverse action may occur. For the purpose of obtaining a more uniform operation the present invention provides what may be termed a triple baffle of suitable material, such as a nichrome ribbon. See Figs. 3 to 7. This baffle may be composed of two wedge or trough-shaped portions 85 and 86 transversely disposed with respect to each other and held in spaced relation. The portion 86 being positioned midway between the ends of the portion 85 and upon the side opposite to the trough thereof. The portion 85 is provided with a cross or bridge piece 87 disposed substantially midway between the ends of said portion.

The cross piece 87 has a centrally disposed aperture 88 positioned in line with an aperture 89 in the portion 86. The aperture 89 may be formed by a punching operation so as to provide a wall of metal 91 between the portion 85 and 86 which wall by reason of the spacing of the said portions is surrounded by an air space 90. The wall 91 provides a cavity into which the effective heater element 92 of the thermocouple may be disposed. The master flame 25 enters the hole 88 and the inner cone 81 thereof intersects the bottom 85' of the trough 85 so that the said inner cone creates a cool spot and the surrounding portion of the flame is substantially enclosed by the bottom of the portion 85 and cross piece 87.

A slight increase in the length of the flame causes the same to issue from between the baffles, thus avoiding an excessive conduction of heat to the thermocouple. The air space provided between the portions 85 and 86 further prevents the high temperature ring surrounding the cool spot from seriously affecting the thermocouple.

It will be understood that by reason of the novel construction of the present baffle, a more effective and positive operation of the thermocouple is possible. Inasmuch as the thermocouple must be directly sensitive to the variations of the inner cone of the flame, it is essential to maintain the thermocouple from receiving heat from a source other than that which exists in the area of the cool spot.

In operation, the various control elements will perform their functions in accordance with the variation in temperature or flame length of the master flame 25. Assuming that the needle 32 has moved to engage with the contact 34. This means that the flame 25 impinging upon the baffle is shortened. The inner cone of the flame will, therefore, have been slightly withdrawn and by reason of the baffle construction the outer or hot ring of the flame will increase the temperature of the thermocouple.

The temperature of the thermocouple will, therefore, rapidly rise. It is to be noted that the thermocouple operates reversely, that is, if the flame length shortens, the area of the cool spot decreases, the surrounding flame serves to heat the thermocouple which causes mechanism to supply more gas to the flames. On the other hand, if the flame lengthens, the cool spot increases in area and the temperature of the thermocouple is reduced. If the flame maintains its proper length but the composition of the gas is such that the flame becomes hotter; then the cool spot will obviously become hotter and cause the thermocouple to act. Inasmuch as it is necessary to increase the temperature of the thermocouple when the flame shortens and reduce the temperature when the flame lengthens, the importance of the present type of baffle will be appreciated.

Under ordinary conditions, a lengthening of the flame would cause the heat from the surrounding cone or hot portion of the flame to materially affect the thermocouple and cause a reverse action. With the present construction, however, when the flame length increases and the hot portion of the flame surrounding the cool spot grows in area, the divergent walls of the baffle together with the compartment and the air space between the thermocouple and the heated portion of the baffle operate to prevent the radiation of heat to the thermocouple making it positive in its operation and controllable by variations in the area and temperature of the intersected inner cone or cool spot of a flame. By providing a baffle with a compartment in which the master flame is partly confined, it becomes necessary when the flame length increases, for part of the outer ring of the flame to withdraw from the baffle proper, that is, burn outside of the compartment in order to have sufficient oxygen to maintain combustion. By this arrangement, the surplus heat of the flame is dissipated, making the cool spot and the hot ring surrounding the same uniform in their variations of temperature.

When the needle 32 engages with contact 34, as above assumed, current flows from the main source through conductors, 68, 76, coil 72, conductor 70, through the needle, conductor 77, armatures 65 (which is in the position as shown in dotted lines), conductor 66 and to the source of electrical energy. This results in a flow of energy through the coil 72 and the armature is pulled into engagement with the contacts 64 and 74.

Since an engagement between the armature 65 and the contact 64 connects conductors 62 and 66, a flow of current occurs in the coil 61 of the relay 36. The armature 58 is, therefore, moved to direct nozzle 38 for the discharge of water into the compartment 46 with a consequent partial filling of the bucket 37 to increase the weight thereof and gradually actuate the pressure regulator 11 which slightly increases the opening in the main valve 16 to bring the master flame back to its original setting. This, of course, also causes all the flames controlled by the master flame to be regulated and adjusted to their original setting.

If the flame 25 then begins to lengthen, the temperature of the thermocouple will be reduced and the needle will move toward the contact 33. The armature 65 will still remain in engagement with the contacts 64 and 74 since a flow of current passes through the coil 72 of the relay 35 by reason of the engagement between the contact 74 and the armature 65, current flowing from the source through conductor 66, armature 65, coil 72, conductor 76, resistance 75 and conductor 68. The water will thus continue to flow into the bucket until the pointer 32 engages with the contact 33. When this occurs, the coil 72 of the relay 35 will be short-circuited, that is, not sufficient current will flow therethrough to overcome the action of spring 73 and the armature 65 will again move to the position shown in dotted lines.

Inasmuch as the armature 65 moves away from the contact 64, the flow of energy through the coil 61 of the relay 36 will be terminated and the nozzle 38 will be moved by reason of the spring 60 to discharge water into compartment 47 and thence to waste. A reversal of the foregoing operation occurs upon a shortening of the master frame.

The liquid operated regulator for the pressure regulator 11 is of considerable advantage in connection with the present type of apparatus since it has a wide range of adjustment as, for example, the valve 44 may be adjusted so that a very fine stream of water will flow from the nozzle 38 or a valve 65 in the outlet pipe of the bucket may be adjusted to give the desired outlet and thus the proper gradual decrease in the weight of the bucket to attain the proper degree of regulation of the pressure regulator 11.

Although the invention has been more particularly described in connection with the control or regulation of gaseous fuel, it will be appreciated that the invention also contemplates the regulation of another gaseous medium such as the air with which the fuel is mixed prior to ignition.

The air supplied to the gas line may be controlled in a manner similar to that set forth for controlling the pressure of the gaseous fuel. It has been found, however, that the gas such as the usual illuminating gas as well as the air, which is mixed therewith, may be controlled simultaneously and in proper relation to each other. For this purpose an air line is provided with a pressure regulator similar to that hereinbefore described for use in the gas line.

The gas and air regulators may be so associated that a common means of regulation may be employed controllable by the length and temperature of an ignited portion of the mixed air and gas.

In accomplishing the above, as shown in Fig. 8, a gas regulator 11', similar to that shown in Fig. 1, may be employed in conjunction with an air regulator 100. This regulator may be the same as that employed for the gas or of any well-known type and connected to an air line 101 by a conductor 102.

The regulator is usually supplied with a properly positioned diaphragm sensitive to the pressure within the air line or main.

The diaphragm operates to move a lever-arm 103 which may be connected to a link 104 pivotally connected to an arm 105 of a regulator valve 106.

The diaphragm within the regulator 100 may be set so that the valve 106 will be automatically opened and closed to maintain a given pressure of air in that part of the main, which conducts air to be mixed with the fuel used by the various machines in the form of flames.

The pressure regulator 100, being same type as the pressure regulator 11, is provided with a dependent member 107, which under ordinary conditions is weighted and so associated with the diaphragm as to operate the valve 106 above or below a given pressure, as in the case of the regulator 11', however, the weights are omitted. A dependent member 108 of the regulator 11' and member 107 of regulator 100 are provided with a trunnion or balance bar 109.

The weight may be in the form of a bucket 110 to receive liquid, as water, and may be suitably disposed over a waste pipe 111. The bucket may be movable along the bar 109 from an end E to an end F. When the bucket is at E the maximum amount of control of air is attained and a minimum amount of control with respect to the gas. When the bucket is at F the maximum amount of control is attained on the gas and the minimum amount is with respect to the air.

Inasmuch as the adjustment of a gas flame requires some adjustment of the air as well as the gas it will be evident that any necessary ratio of adjustment between the two can be obtained. By experiment a point along the bar 109 may be found that will give the most efficient flame control under all conditions and variations.

In order that bucket may be adjusted from one position to the other the discharge pipe 111 may be provided with a flexible connection 112, and may be secured in a block 113 slidable on a guide 114.

The bracket supporting the nozzle and its operating mechanism may also be mounted in a sliding block 115, movable along a guide 116, so as to be adjustable with respect to the funnel 45. The adjustment means are merely illustrative and various modes of adjustment will suggest themselves to the skilled mechanic. When a point is found at which the bucket 110 is to be maintained the nozzle 38, funnel 45 and discharge pipe 111 may be secured in proper relation.

From the foregoing it will be evident that the present invention provides for the automatic regulation of a fluid in accordance with variations in the temperature and flame length of a discharged ignited operation of the fluid.

In the large factories where a great number of gas burners require regulation, it is important to provide a simple and flexible means for their control. It has been found that by the use of the present regulating apparatus an entire factory burning hundreds of gas flames in connection with glass working operations are capable of proper regulation when the supply of gas is adjusted in accordance with the present system.

Although a preferred embodiment of the invention is shown and described herein, it is to be understood that variations and modifications may be made therein without departing from the spirit and scope of the invention as set forth in the appended claims.

What is claimed is:

1. An apparatus for maintaining gas flames at constant lengths and temperatures comprising a main gas supply line, a pressure regulator for said line, liquid actuated means for controlling said pressure regulator, means for producing a master flame, a baffle disposed transversely to said flame to intersect the inner cone thereof and produce a relatively cool portion surrounded by a relatively hot portion, means associated with said baffle for dissipating heat from the said hot portion to avoid transfer of heat to said cool spot and means responsive to the change in temperature in said cone for controlling said fluid actuated means.

2. An apparatus for regulating the flow of fluid from different sources comprising a plurality of conductors for the respective fluids, a common conductor for receiving a mixture of said fluids, means for producing a flame of the ignited mixed fluids and means responsive to the temperature of said flame for maintaining said flame constant.

3. An apparatus for regulating the flow of gases from different sources, comprising a gas main having a pressure regulator associated therewith, another gas main having a pressure regulator associated therewith and means for controlling said regulators in accordance with the length and temperature of a flame resulting from a mixture of said gases.

4. An apparatus for regulating the flow of gases from different sources, comprising a gas main having a pressure regulator associated therewith, another gas main having a pressure regulator associated therewith and heat responsive means for controlling said regulators in accordance with the length and temperature of a flame resulting from a mixture of said gases.

5. An apparatus for maintaining gas flames at constant lengths and temperature, comprising conductors for a plurality of different gases to be mixed for producing flames, a conductor for each gas, a regulator associated with each conductor and thermostatic means responsive to the temperature of at least one of said flames to actuate the control regulators to vary the pressures in said conductors with relation to each other to control the flow of the respective gases to maintain the gas flames constant in length and temperature.

6. In a device for maintaining a gas flame at a given length and temperature, the combination with a baffle having a plate disposed to intersect a flame, and means associated with said baffle for diverting a portion of said flame away from said plate.

7. In a device for maintaining a gas flame at a given length and temperature the combination with a baffle having a plate disposed to intersect a flame, and a compartment associated with said plate for confining a portion of said flame to cause the same to pass partly out from said chamber and away from said baffle.

8. In a device for maintaining a gas flame at a given length and temperature the combination with a trough-shaped baffle having a flattened bottom portion for the impingement of a gas flame thereon, a cross-piece bridging said trough and having an aperture to permit said flame to impinge upon the bottom of said baffle, a heat radiating member associated with the side of said baffle opposite to the impinging flame, and a pocket in said member to receive a heat responsive element.

9. In a device for maintaining a gas flame at a given length and temperature the combination with a trough-shaped baffle having a flattened bottom portion for the impingement of a gas flame thereon, a cross-piece bridging said trough and having an aperture to permit said flame to impinge upon the bottom of said baffle, a heat radiating member associated with and spaced from the side of said baffle opposite to the impinging flame, and an aperture in said member to permit the disposition of a thermocouple in close proximity to the high temperatured portion of said baffle.

10. In a device for maintaining a gas flame at a given length and temperature the combination with a trough-shaped baffle having a flattened bottom portion for the impingement of a gas flame thereon, a cross-piece bridging said trough and having an aperture to permit said flame to impinge upon the bottom of said baffle, a heat radiating member associated with and spaced from the side of said baffle opposite to the impinging flame, an aperture in said member to permit the disposition of a thermocouple in close proximity to the heated portion of said baffle, and a surrounding wall for said thermocouple when disposed in said aperture between said member and said baffle.

11. A heating radiating element comprising a sheet metal member to provide a trough having closed ends, a cross-piece bridging said trough to provide an open ended enclosure, an aperture in said cross-piece to permit a flame to impinge upon the bottom of said trough, and a heat radiating member associated with said trough.

12. A heat radiating element comprising a sheet metal member to provide a trough having closed ends, a cross-piece bridging said trough to provide an open ended enclosure, an aperture in said cross-piece to permit a flame to impinge upon the bottom of said trough, and a heat radiating member spaced from and disposed upon a side of said trough opposite to the side upon which the flame impinges.

13. A heat radiating element comprising a sheet metal member to provide a trough having closed ends, a cross-piece bridging said trough to provide an open ended enclosure, an aperture in said cross-piece to permit a flame to impinge upon the bottom of said trough, and a heat radiating member spaced from and disposed upon a side of said trough opposite to the side upon which the flame impinges, said heat radiating member having elongated fins and being disposed transverse to said trough.

14. An apparatus for maintaining gas flames at constant lengths and temperatures comprising a main gas supply line, means for producing flames from said line, a gas pressure regulator, fluid actuated means for controlling said regulator, an electrical circuit, means for controlling said fluid actuated means upon a flow of energy through said circuit and heat responsive means associated with said flames for causing a flow of energy through said circuit.

15. An apparatus for maintaining gas flames at constant lengths and temperatures comprising a main gas supply line, means for producing a flame from said line, a gas pressure regulator, an electrical circuit, liquid actuated means for controlling said regulator, a member for controlling said liquid actuated means upon a flow of electrical energy through said circuit and thermo-electric means associated with said flame for producing a flow of electrical energy through said circuit.

16. A gas flame control apparatus comprising a gas supply line, means for producing a flame from said line, a regulator for said line, an electrical system comprising a thermo-couple associated with said flame for producing a flow of energy in a portion of said circuit, a relay in said circuit, means for utilizing electrical energy generated by said thermo-couple to actuate said relay, another source of electrical energy, a second relay, means for causing said first mentioned relay to cause a flow of electrical energy from said second source to actuate said second mentioned relay and means controlled by said last mentioned relay for varying the operation of said regulator.

17. In combination with a fluid pressure regulator, an apparatus for controlling a flame comprising a conductor for a fluid connected with said regulator, means for producing a flame from said conductor, an electrical circuit, regulator-control means operable upon a flow of electrical energy through said circuit, a baffle intersecting the inner cone of said flame to produce a concentrated heat radiating area on said baffle and means responsive to variations in the temperature of the heat radiated from said area for effecting a flow of electrical energy in said circuit.

18. In combination with a fluid pressure regulator, an apparatus for maintaining gas flames at predetermined lengths and temperatures comprising a main gas supply line connected with said regulator, means for producing flames from said line, an electrical circuit, control means for said regulator operable upon a flow of electrical energy through said circuit, a baffle plate, means for supporting said plate for the impingement of said flame on one side thereof and heat responsive means disposed on the opposite side of said plate for effecting a flow of electrical energy in said circuit.

19. In combination with a pressure regulator, an apparatus for maintaining gas flames at constant lengths and temperatures comprising a main gas supply line connected to said regulator, means for producing a flame from said line, an electrical circuit, means for controlling said pressure regulator upon a flow of current through said circuit, a baffle plate intersecting said flame to provide a concentrated heat radiating area and thermo-electric means disposed adjacent to said heat radiating area to produce a flow of electrical energy through said circuit.

20. In combination with a fluid pressure regulator, an apparatus for maintaining gas flames at constant lengths and temperatures comprising a main gas supply line connected to said regulator, means for producing a flame from said line, an electrical circuit, regulator control means, a relay for actuating said regulator control means upon a flow of energy through said circuit, a baffle plate intersecting said flame to provide a heat radiating area and heat responsive means disposed adjacent to said heat radiating area for causing a flow of electrical energy through said circuit to actuate said relay.

21. In combination with a fluid pressure regulator, a gas flame control system comprising a gas supply line, a flame produced from said line, electrically operable means for controlling said regulator, a baffle plate intersecting said flame to produce a heat radiating area, heat responsive means disposed adjacent to said heat radiating area to cause a flow of electrical energy for the actuation of said first mentioned means.

22. An apparatus for controlling a flame comprising a fluid conductor, a flame produced from said conductor, electrically operable means for controlling the pressure of fluid in said conductor, a baffle plate positioned with said flame impinged against one side thereof and means responsive to heat radiated from the opposite side of said plate for causing a flow of electrical energy for actuating said first mentioned means.

23. An apparatus for controlling a flame comprising a conductor for a fluid, means for producing a flame from said conductor, a pressure regulator for said conductor, an electrical circuit, means operable upon a flow of electrical energy through said circuit to regulate the pressure of said fluid, a baffle plate disposed with said flame impinged against one side thereof to provide a concentrated heat radiating area and means responsive to heat radiated from said area for effecting a flow of electrical energy in said circuit.

In testimony whereof, I have hereunto subscribed my name this 29th day of July, 1926.

LANDON R. CALVERT.